US008056367B2

(12) United States Patent
Kin et al.

(10) Patent No.: US 8,056,367 B2
(45) Date of Patent: Nov. 15, 2011

(54) PROCESS FOR PRODUCING GLASS SHEET AND GLASS SHEET PRODUCING EQUIPMENT

(75) Inventors: Shusei Kin, Otsu (JP); Hidetaka Oda, Otsu (JP); Masahiro Tomamoto, Otsu (JP)

(73) Assignee: Nippon Electric Glass Co., Ltd., Shiga (JP)

( * ) Notice: Subject to any disclaimer, the term of this patent is extended or adjusted under 35 U.S.C. 154(b) by 156 days.

(21) Appl. No.: 12/597,104

(22) PCT Filed: Apr. 2, 2008

(86) PCT No.: PCT/JP2008/056543
§ 371 (c)(1),
(2), (4) Date: Nov. 5, 2009

(87) PCT Pub. No.: WO2008/132939
PCT Pub. Date: Nov. 6, 2008

(65) Prior Publication Data
US 2010/0122556 A1    May 20, 2010

(30) Foreign Application Priority Data

Apr. 24, 2007    (JP) .................. 2007-114311

(51) Int. Cl.
*C03B 23/00* (2006.01)
*C03B 21/00* (2006.01)

(52) U.S. Cl. .............. 65/165; 65/28; 65/97; 83/104; 225/3; 225/4

(58) Field of Classification Search ............ None
See application file for complete search history.

(56) References Cited

U.S. PATENT DOCUMENTS

| 1,643,152 A | * | 9/1927 | Debrocq | 65/165 |
| 1,643,184 A | * | 9/1927 | Spinasse | 65/165 |
| 3,216,809 A | * | 11/1965 | Slabodsky | 65/29.18 |
| 4,233,048 A | * | 11/1980 | Gintert | 65/27 |

(Continued)

FOREIGN PATENT DOCUMENTS

DE    100 40 640    3/2002

(Continued)

OTHER PUBLICATIONS

Supplementary European Search Report dated May 3, 2010 in corresponding European Application No. 08739654.5.

(Continued)

*Primary Examiner* — Jason L Lazorcik
*Assistant Examiner* — Jodi Cohen
(74) *Attorney, Agent, or Firm* — Wenderoth, Lind & Ponack, L.L.P.

(57) ABSTRACT

A situation where glass chip produced as a result of breakage of waste glass sheets floats in a cutting chamber when the waste glass sheets produced in glass sheet producing steps are collected is suppressed. Provided is a glass sheet production installation (1), in which a sheetshaped glass ribbon (B) is formed by supplying molten glass (A) into a forming body (2) and causing the molten glass (A) to flow downward on a conveyance path extending in an upper and lower direction from the forming body (2), and the glass ribbon (B) is cut into a predetermined dimension in a cutting chamber (6) provided on the conveyance path so that glass substrates (C) are produced. The glass sheet production installation (1) is provided with a drop hole (8) provided in a floor surface of the cutting chamber (6) and a collection chamber (7) provided under the cutting chamber (6) and is configured so as to collect waste glass substrates of the glass substrates (C) by dropping the waste glass substrates through a drop hole (8) into the collection chamber (7), the glass substrates (C) being obtained by cutting.

20 Claims, 2 Drawing Sheets

U.S. PATENT DOCUMENTS

| | | | |
|---|---|---|---|
| 4,815,644 A * | 3/1989 | Garrick et al. | 225/97 |
| 5,069,704 A * | 12/1991 | Boutier et al. | 65/106 |
| 6,502,423 B1 * | 1/2003 | Ostendarp et al. | 65/29.14 |
| 6,616,025 B1 * | 9/2003 | Andrewlavage, Jr. | 225/96.5 |
| 6,758,064 B1 | 7/2004 | Kariya | |
| 2004/0050894 A1 | 3/2004 | Andrewlavage, Jr. | |
| 2006/0236722 A1 | 10/2006 | Delia et al. | |
| 2009/0226733 A1 * | 9/2009 | Kato et al. | 428/428 |
| 2010/0043495 A1 * | 2/2010 | Kirby et al. | 65/91 |
| 2010/0269542 A1 * | 10/2010 | Nishiura et al. | 65/95 |
| 2010/0281920 A1 * | 11/2010 | Nishiura et al. | 65/95 |

FOREIGN PATENT DOCUMENTS

| | | |
|---|---|---|
| EP | 1 721 872 | 11/2006 |
| JP | 06-091235 | 4/1994 |
| JP | 10-053426 | 2/1998 |
| JP | 2001-31435 | 2/2001 |
| JP | 2002-137930 | 5/2002 |
| WO | 02/14229 | 2/2002 |
| WO | 2006/121709 | 11/2006 |

OTHER PUBLICATIONS

International Search Report dated Jul. 8, 2008 for International Application No. PCT/JP2008/056543.

International Preliminary Report on Patentability and Written Opinion of the International Searching Authority dated Nov. 19, 2009 in International (PCT) Application No. PCT/JP2008/056543.

\* cited by examiner

PROCESS FOR PRODUCING GLASS SHEET AND GLASS SHEET PRODUCING EQUIPMENT

TECHNICAL FIELD

The present invention relates to a glass sheet producing method and a glass sheet production installation, and more particularly, to an improvement of a technology for producing glass sheets by a so-called downdraw method in which glass sheets are produced by cutting a glass ribbon formed by causing molten glass to flow downward from a forming body into a predetermined dimension.

BACKGROUND ART

As is well known, regarding production of glass sheets, the so-called downdraw method is publicly known, in which glass sheets are produced by forming a glass ribbon formed by causing molten glass to flow downward from a forming body and the glass ribbon is cut into a predetermined dimension. Typical examples thereof include an overflow downdraw method (fusion method) and a slot downdraw method. In the former overflow downdraw method, glass sheets are produced by causing molten glass supplied into the forming body having a wedge-like shape in cross section to flow downward from the top of the forming body along both side surfaces thereof so as to be fused at a lower end portion of the forming body and to be formed into a single sheet-like shape, by causing the glass ribbon in this sheet-like shape to flow downward from the lower end portion of the forming body, and by finally cutting the hardened glass ribbon into a predetermined dimension. Meanwhile, in the latter slot downdraw method, glass sheets are produced by causing molten glass supplied into the forming body to flow downward from a slit in an oblong shape formed in a bottom portion of the forming body so as to be formed into a sheet-like shape, by causing the glass ribbon in this sheet-like shape to flow downward along a conveyance path, and then by finally cutting the hardened glass ribbon into a predetermined dimension.

In a glass sheet production installation of this type, in which the downdraw method is utilized, there are arranged, below a forming chamber in which the forming body is accommodated, an annealing chamber for annealing the glass ribbon, a cutting chamber for cutting the cooled glass ribbon into glass sheets having a predetermined dimension, and the like. In addition, cooling steps for the glass ribbon in the annealing chamber and the like have a significant influence on the product quality of the glass sheets finally produced. Thus, it is necessary to strictly control atmospheric temperatures therein. Under the circumstance, in order to prevent variation in the atmospheric temperature, the conveyance path for the glass ribbon vertically extends in a chimney shape, with the periphery thereof being surrounded (refer to JP 10-53426 A and JP 2001-31435 A, for example).

Incidentally, in recent years, as is typified by glass substrates for flat panel displays such as liquid crystal displays and the like, various glass sheets are demanded to be of a higher grade and to have higher quality under the present circumstances. In this context, glass sheets (defective glass sheets) which do not meet the demands are produced in producing steps thereof in many cases, and hence it is necessary to classify and to collect the defective glass sheets. Similarly, also in the case where some troubles occur in steps subsequent to a cutting step in the producing steps, a situation may occur where glass sheets cannot be loaded in the steps subsequent to the cutting step. In this case also, it is necessary to collect the glass sheets. Thus, in the conventional producing steps in the glass sheet production installation as described above, in the case where failures such as intolerable distortion and inclusion occur in the glass ribbon and the glass sheets obtained by cutting, or in the case where glass sheets cannot be loaded in the steps subsequent to the cutting step irrespective of presence and absence of the failures, the glass sheets (waste glass sheets or cullet) are discarded into a dedicated collection box arranged in the cutting chamber.

In this case, when flowing-down of the molten glass from the forming body is interrupted so as to stop forming of the glass ribbon, it becomes considerably difficult to restore a forming condition into a desired state. Thus, even when it becomes necessary to discard a glass ribbon to be formed, the glass ribbon is sequentially cut and the glass sheets obtained by cutting are discarded into the collection box while supply of the glass ribbon into the cutting chamber is maintained as it is.

DISCLOSURE OF THE INVENTION

Problem to be Solved by the Invention

However, when the waste glass sheets are discarded into the above-mentioned collection box, breakage occurs in the waste glass sheets in some cases. In this case, minute glass chip is produced so as to float in the cutting chamber. Thus, even when ex-post elimination of a cause of production of the waste glass sheet is achieved and production of normal glass sheets is restarted, the floating glass chip adheres to surfaces of the normal glass sheets. In this context, the glass chip having adhered thereto as described above cannot be easily removed, and the glass chip may constitute an additional cause of production of the waste glass sheets.

In addition, in recent years, as is typified by glass substrates for liquid crystal displays, various glass sheets produced by the downdraw method are promoted to increase in size and to decrease in thickness. In accordance therewith, breakage is liable to occur when the waste glass sheets are discarded into the collection box. Further, an increase in size of the glass sheets involves an increase in size of the waste glass sheets themselves, and an amount of the glass chip produced at the time of breakage is significantly increased. Therefore, the above-mentioned problem caused by the floating glass chip in the cutting chamber more remarkably appears.

In particular, regarding the glass substrates for flat panel displays such as liquid crystal displays, plasma displays, and the like, in which high cleanliness is demanded on the glass sheets themselves, the glass chip adhering thereto constitutes a fatal defect. Thus, a situation may frequently occur where the glass sheets are inevitably treated as waste glass sheets.

Under the circumstances, a technical object of the present invention is to suppress a situation where glass chip produced as a result of breakage of the waste glass sheets floats in the cutting chamber when the waste glass sheets produced in the glass sheet producing steps are collected.

Means for Solving the Problems

In order to achieve the above-mentioned object, a method according to the present invention includes a glass sheet producing method, in which a sheetshaped glass ribbon is formed by supplying molten glass into a forming body and causing the molten glass to flow downward on a conveyance path extending in an upper and lower direction from the forming body, and the glass ribbon is cut into a predetermined dimension in a cutting chamber provided on the conveyance path so that glass sheets are produced. The glass sheet producing method includes a waste glass sheet collecting step of collecting waste glass sheets of the glass sheets by dropping the waste glass sheets through a drop hole provided in a floor surface of the cutting chamber into a collection chamber provided under the cutting chamber, the glass sheets being obtained by cutting.

According to the method as described above, the waste glass sheets can be collected merely by being dropped through the drop hole provided in the floor surface of the cutting chamber into the collection chamber provided under the cutting chamber. Further, the waste glass sheets are collected in the collection chamber provided separately from the cutting chamber. Thus, unlike the case of providing the dedicated collection box in the cutting chamber, it is possible to avoid a situation where the glass chip is produced in the cutting chamber as a result of breakage of the waste glass sheets. In addition, the cutting chamber and the collection chamber are partitioned as separate chambers. Thus, even in the case where the glass chip is produced as a result of breakage of the waste glass sheet dropped into the collection chamber, it is possible to suppress a situation where the glass chip intrudes into the cutting chamber.

In the method described above, the floor surface of the cutting chamber is preferred to be 2 to 15 m, in particular, 3 to 10 m higher than a floor surface of the collection chamber.

With this, it is possible to make the glass chip produced in the collection chamber less easily reach the cutting chamber. Note that, the above-mentioned effect cannot be obtained when the floor surface of the cutting chamber is excessively low, and the installation becomes larger when the floor surface of the cutting chamber is excessively high in contrast, which is not preferred.

In the method described above, the waste glass sheet collecting step is preferred to be performed in a state in which air pressure in the collection chamber is set to be lower than air pressure in the cutting chamber.

With this, it is possible to prevent generation of airflow flowing from the collection chamber into the cutting chamber through the drop hole, and hence possible to suppress a situation where the airflow causes the glass chip in the collection chamber to intrude into the cutting chamber. Thus, it is possible to more reliably suppress a situation where the glass chip floating in the collection chamber floats into the cutting chamber.

In the method described above, the waste glass sheet collecting step is preferred to be performed in a state in which the collection chamber is constituted by a space defined by being closed with other chamber-defining surfaces except the opened drop hole.

With this, it is possible to adequately prevent a situation where a gas in the collection chamber flows into the cutting chamber together with the glass chip through the drop hole. This is caused by the following phenomenon.

In the glass sheet producing steps, temperature on the upstream side (upper portion) of the conveyance path is higher than that on the downstream side (lower portion) thereof, and temperature of the atmosphere in the upper portion is much higher than that of the outside air. In addition, it is common to provide an annealing chamber, a cooling chamber, or the like in the upper portion in a high temperature state as described above. For the purpose of restriction of contraction of a glass ribbon in the width direction and the like, rollers for sandwiching the glass ribbon and rolling are arranged in those annealing chamber and the like. Further, shaft portions of the rollers pass through chamber-defining surfaces of the annealing chamber and the like so as to be connected to bearings or the like arranged on the outside. Thus, slight clearances are secured between the shaft portions of the rollers and the chamber-defining surfaces of the annealing chamber and the like, and a state of being communicated with the outside air is achieved. In this context, description is made on the case where the upper portion of the conveyance path, in which atmospheric temperature is higher than that of the outside air, is in the state of being communicated with the outside air as described above. On the assumption that the lower portion of the conveyance path is communicated with the outside air, owing to a so-called chimney effect, an atmosphere of high temperature flows out from the upper portion to the outside and the outside air is sucked from the lower portion, which thus leads to a risk that ascending airflow occurs on the conveyance path. In the case where the inside of the collection chamber is communicated with the outside air, occurrence of the ascending airflow as described above may constitute a factor of floating the glass chip in the collection chamber into the cutting chamber. Thus, as described above, by constituting the collection chamber as a space defined by being closed with other chamber-defining surfaces except the opened drop hole, it is possible to prevent the outside air from flowing into the collection chamber. As a result, it is possible to prevent the ascending airflow from occurring owing to the chimney effect. Therefore, it is significantly useful in suppressing intrusion of the glass chip into the cutting chamber.

Further, in order to increase a producing amount of the glass sheets, it is necessary to perform a step of cooling the glass ribbon for a longer period of time on the conveyance path. As a result, a difference in height of the conveyance path is increased so as to increase the influence of the ascending airflow occurring in the case where the chimney effect is yielded. In this context, according to the above-mentioned method, it is possible to adequately prevent the ascending airflow from occurring owing to the chimney effect even when the length of the conveyance path is elongated. Thus, it is possible to suitably cope with the case where an increase in the producing amount of the glass sheets is demanded.

In the method described above, in the waste glass sheet collecting step, the drop hole is preferred to be opened only in a case where the waste glass sheets are dropped into the collection chamber.

With this, except when the waste glass sheets are dropped into the collection chamber from the drop hole, a communication state between the cutting chamber and the collection chamber is shut. Thus, it is advantageous in suppressing a situation where the glass chip in the collection chamber intrudes into the cutting chamber.

In the method described above, the waste glass sheet collecting step is preferred to be performed while dust in the collection chamber is collected by a dust collector arranged in the collection chamber. Note that, the dust collector may be continuously operated or may be intermittently operated.

With this, it is possible to lower the air pressure in the collection chamber than the air pressure in the cutting chamber, and it is possible to easily and directly reduce the glass chip floating in the collection chamber.

In the method described above, the waste glass sheet collecting step is preferred to be performed while a clean gas (air, for example) is supplied into at least one of the cutting chamber and the spaces thereabove. Note that, gas supply may be continuously performed or may be intermittently performed.

With this, it is possible to lower the air pressure in the collection chamber than the air pressure in the cutting chamber.

In the method described above, in the waste glass sheet collecting step, nonflammable liquid may be caused to act on the waste glass sheets dropped into the collection chamber. In this case, examples of the nonflammable liquid include water.

With this, the glass chip in the collection chamber is humidified by the nonflammable liquid, and hence floating of the glass chip is suppressed. As a result, it is possible to suppress the intrusion of the glass chip into the cutting chamber.

In this case, the nonflammable liquid is preferred to be pooled in the collection chamber and the waste glass sheets are preferred to be dropped into the pooled nonflammable liquid.

With this, the waste glass sheets drop directly into the nonflammable liquid pooled in the collection vessel or the like arranged in the collection chamber. Thus, even when the waste glass sheets suffer breakage, the glass chip produced as a result of the breakage remains in the nonflammable liquid. Thus, it is possible to suppress a situation where the glass chip disperses in the collection chamber.

In order to achieve the above-mentioned object, a production installation according to the present invention includes a glass sheet production installation, in which a sheetshaped glass ribbon is formed by supplying molten glass into a forming body and causing the molten glass to flow downward on a conveyance path extending in an upper and lower direction from the forming body, and the glass ribbon is cut into a predetermined dimension in a cutting chamber provided on the conveyance path so that glass sheets are produced. The glass sheet production installation includes: a drop hole provided in a floor surface of the cutting chamber; and a collection chamber provided under the cutting chamber, and in which waste glass sheets of the glass sheets obtained by cutting are collected after being dropped through the drop hole into the collection chamber.

With this structure, it is possible to avoid a situation where a glass chip is produced in the cutting chamber as a result of breakage of the waste glass sheets.

In the structure described above, the floor surface of the cutting chamber is preferred to be provided in a position 2 to 15 m, in particular, 3 to 10 m higher than a floor surface of the collection chamber.

With this, it is possible to make it more difficult for a glass chip produced in the collection chamber to reach the cutting chamber.

In the structure described above, air pressure in the collection chamber is preferred to be set to be lower than air pressure in the cutting chamber.

With this, it is possible to suppress a situation where airflow causes a glass chip in the collection chamber to intrude in the cutting chamber.

In the structure described above, the collection chamber is preferred to be constituted by a space defined by being closed with other chamber-defining surfaces except the opened drop hole.

With this, it is possible to adequately prevent a situation where a gas in the collection chamber flows into the cutting chamber together with a glass chip.

In the structure described above, an open/close mechanism for opening and closing the drop hole is preferred to be provided.

With this, it is possible to suppress a situation where a glass chip in the collection chamber intrudes into the cutting chamber.

Effects of the Invention

As described above, according to the present invention, the waste glass sheets can be easily and reliably collected merely by being dropped through the drop hole in the floor surface of the cutting chamber into the collection chamber provided under the cutting chamber. In addition, even in the case where the waste glass sheets collected in the collection chamber suffer breakage so as to produce the glass chip, the cutting chamber and the collection chamber are partitioned as separate chambers, and hence it is possible to avoid production of the glass chip as a result of the breakage of the waste glass sheets in the cutting chamber, and possible to suppress the situation where the glass chip in the collection chamber floats into the cutting chamber.

DESCRIPTION OF THE SYMBOLS

Figure 1:
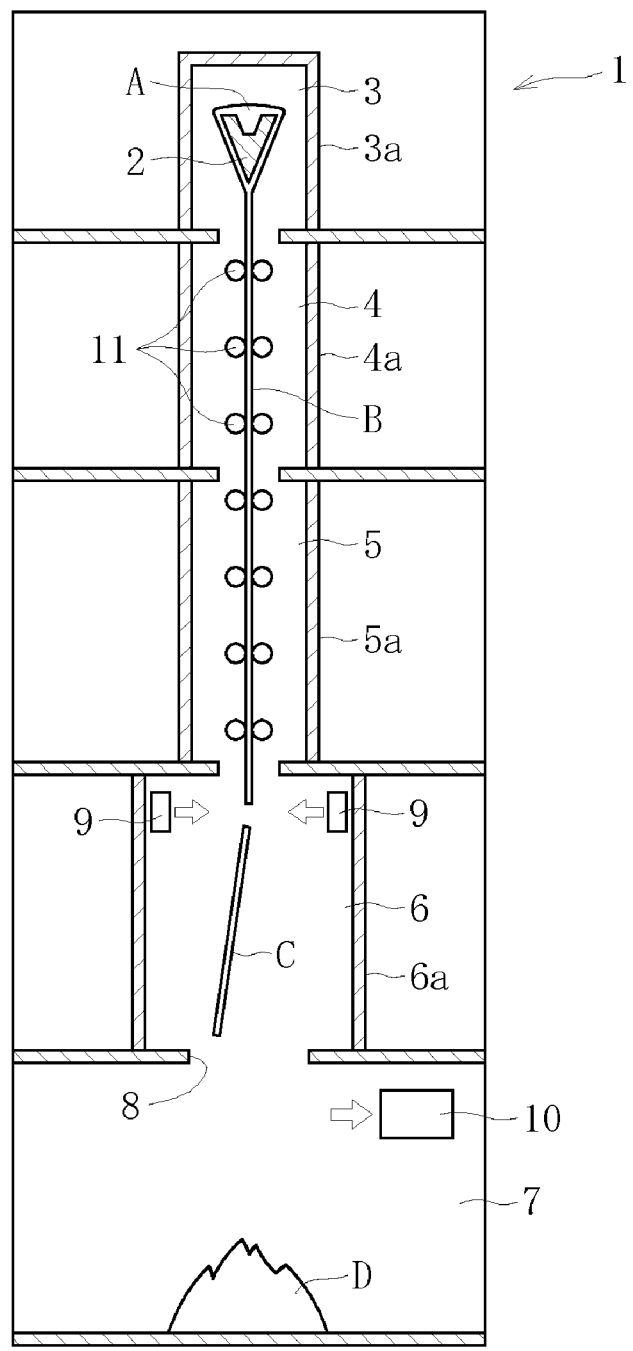
FIG. 1 A schematic vertical sectional view of an internal structure of a glass sheet production installation according to a first embodiment of the present invention.

1 glass sheet production installation
2 forming body
3 forming chamber
4 annealing chamber
5 cooling chamber
6 cutting chamber
7 collection chamber
8 drop hole
9 air blower
10 dust collector
11 roller
12 open/close mechanism
13 water
14 collection vessel
A molten glass
B glass ribbon
C glass substrate
D collected waste glass substrate

BEST MODES FOR CARRYING OUT THE INVENTION

In the following, description is made on embodiments of the present invention with reference to accompanying drawings.

FIG. 1 is a schematic vertical sectional view of an internal structure of a glass sheet production installation according to a first embodiment of the present invention. As illustrated therein, a production installation 1 is provided for producing glass substrates for liquid crystal displays by an overflow downdraw method, and provided with the following in the following order from the top: a forming chamber 3 for forming a glass ribbon B by causing molten glass A supplied into a forming body 2 having a wedge-like shape in cross section to overflow from the top of the forming body 2 and to be fused at the lower end portion thereof, an annealing chamber 4 for removing residual distortion therein while annealing the glass ribbon B, a cooling chamber 5 for sufficiently cooling the annealed glass ribbon B, and a cutting chamber 6 for cutting the cooled glass ribbon B so as to provide a glass substrate C having a predetermined dimension. Only portions between the chambers 3, 4, 5, and 6 adjacent to each other in the upper and lower direction are opened, the portions corresponding to a conveyance path on which the glass ribbon B flows downward. In the chambers 3, 4, 5, and 6, the conveyance path of the glass ribbon B is closed by being surrounded by peripheral wall portions 3a, 4a, 5a, and 6a. Note that, the cutting chamber 6 is provided with another conveyance path for conveying the glass substrate C to subsequent steps (not shown) (end surface polishing step and the like).

Further, a collection chamber 7 is provided under the cutting chamber 6, and the cutting chamber 6 and the collection chamber 7 communicate with each other through a drop hole 8 provided in a floor surface of the cutting chamber 6. Still further, the floor surface of the cutting chamber 6 is located 5 m higher than a floor surface of the collection chamber 7. In the case where failures such as intolerable distortion and inclusion occur in the glass ribbon B caused to flow downward and the glass substrate C obtained by cutting, or in the case where troubles occur in production installation subsequent to the cutting chamber 6, the glass substrate C is collected after being dropped as a waste into the collection chamber 7 through the drop hole 8. Meanwhile, in the case where the glass substrate C is nondefective and the steps subsequent to the cutting chamber 6 are normally performed, the glass substrate C is conveyed from the cutting chamber 6 to the subsequent steps (not shown).

Further, air blowers 9 are arranged in the cutting chamber 6 such that a clean gas (air, for example) is supplied into the cutting chamber 6. Still further, a dust collector 10 is arranged in the collection chamber 7 such that dust is collected by sucking a gas in the collection chamber 7. Yet further, air pressure in the cutting chamber 6 is increased by the air blowers 9 and air pressure in the collection chamber 7 is decreased by the dust collector 10. As a result, the air pressure in the collection chamber 7 becomes lower than the air pressure in the cutting chamber 6. The difference in the air pressure between the cutting chamber 6 and the collection chamber 7 is as large as being capable of preventing airflow from the collection chamber 7 into the cutting chamber 6, and is set in accordance with conditions of the production installation 1, such as a volume ratio between the cutting chamber 6 and the collection chamber 7.

Note that, in this embodiment, a waste glass substrate existing in the cutting chamber 6 is dropped into the collection chamber 7 from a position slightly displaced with respect to a position to which the glass ribbon B is caused to flow downward. This is because the glass ribbon B continuously supplied and the waste glass substrates are prevented from interfering with each other. Further, defects of the glass ribbon B and defects of the glass substrates C (which occur mainly in cutting) are visually recognized by an operator, or automatically detected by a sensor which transmits sound waves, electromagnetic waves (light), or the like. Similarly, occurrence of the troubles in the steps subsequent to the cutting chamber 6 is visually recognized by the operator, or automatically detected by a sensor. Further, collected materials D consisting of the waste glass substrates collected into the collection chamber 7 are crushed, and then recycled as a part of glass material.

Next, description is made on a glass sheet producing step performed by the glass sheet production installation 1 according to the first embodiment of the present invention.

In the glass sheet producing step performed by the glass sheet production installation 1, first, the molten glass A is supplied into the forming body 2 arranged in the forming chamber 3, and the molten glass A is caused to overflow from the top of the forming body 2 and is fused at the lower end thereof so as to form the glass ribbon B. Next, the glass ribbon B thus formed is annealed in the annealing chamber 4 for removing residual distortion, and is sufficiently cooled in the cooling chamber 5. After that, the glass ribbon B thus cooled is cut into a predetermined dimension in the cutting chamber 6. In this manner, the glass substrate C is produced. In the case where the glass substrate C thus produced is nondefective and the steps subsequent to the cutting chamber 6 are normally performed, the glass substrate C is conveyed from the cutting chamber 6 to the subsequent steps (not shown).

Meanwhile, in the case where failures such as intolerable distortion and inclusion occur in the glass ribbon B caused to flow downward and the glass substrate C obtained by cutting, or in the case where troubles occur in the steps subsequent to the cutting chamber 6, the glass substrate C thus produced is collected after being dropped as a waste into the collection chamber 7 through the drop hole 8 provided in the floor surface of the cutting chamber 6 (waste glass sheet collecting step). In this manner, a waste glass substrate (C) is collected in the collection chamber 7 separated from the cutting chamber 6. Thus, unlike the case of providing a collection box in the cutting chamber 6 so as to collect waste glass substrates, it is possible to avoid a situation where glass chip is produced in the cutting chamber 6 as a result of breakage of the waste glass substrate. In addition, the cutting chamber 6 and the collection chamber 7 are partitioned as separate chambers. Thus, even in the case where the glass chip is produced as a result of breakage of the waste glass substrate in the collection chamber 7, it is possible to appropriately suppress a situation where the glass chip intrudes into the cutting chamber 6. Thus, it is possible to suppress a situation where the glass chip floats in the cutting chamber 6 and adheres to a surface of the glass substrate C, and hence possible to suitably maintain production efficiency of the glass substrate C.

Further, the inside of the cutting chamber 6 is pressurized by the gas supplied from the air blowers 9, and the inside of the collection chamber 7 is depressurized owing to air suction caused by the dust collector 10. Thus, it is possible to lower the air pressure in the collection chamber 7 than the air pressure in the cutting chamber 6. With this, it is possible to appropriately prevent generation of the airflow from the collection chamber 7 into the cutting chamber 6, and hence possible to more reliably suppress a situation where the glass chip floating in the collection chamber 7 intrudes into the cutting chamber 6.

Figure 2:
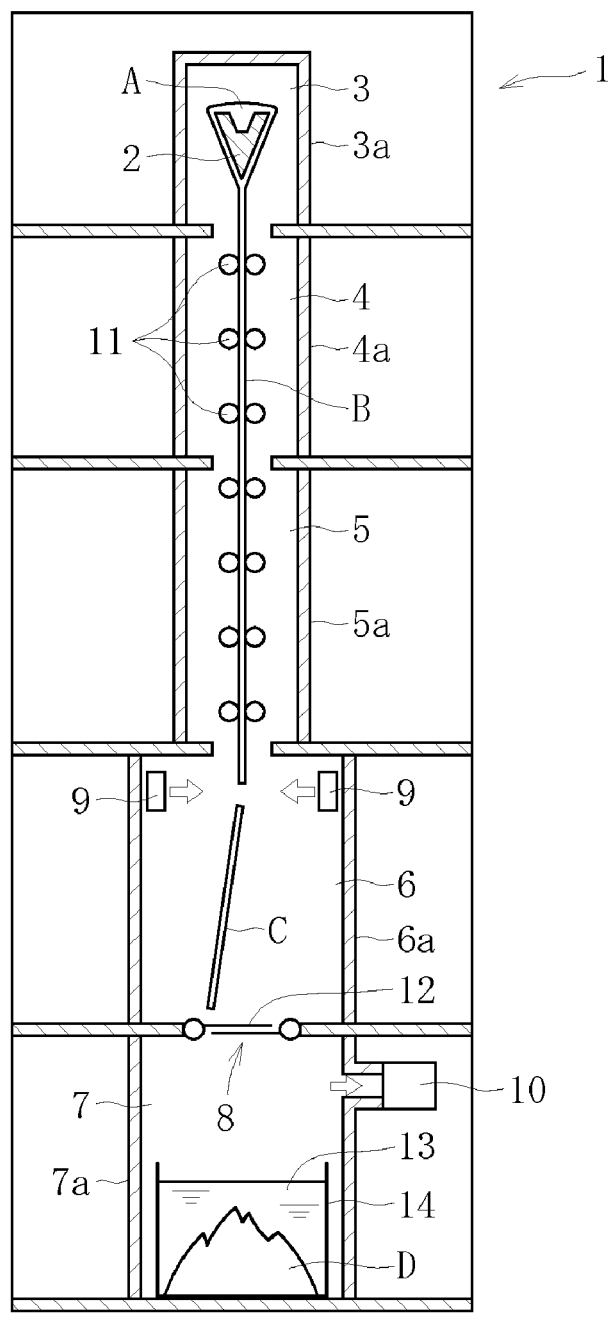
FIG. 2 A schematic vertical sectional view of an internal structure of a glass sheet production installation according to a second embodiment of the present invention.

FIG. 2 is a schematic vertical sectional view of an internal structure of a glass sheet production installation according to a second embodiment of the present invention. As illustrated therein, a first difference between the production installation 1 according to the second embodiment and the production installation 1 according to the first embodiment described above is that a closed space is defined in the collection chamber 7 by surrounding, correspondingly to the periphery of the drop hole 8, the inside of the collection chamber 7 from the ceiling to the floor surface thereof so that only the drop hole 8 is opened and the periphery thereof is closed by a peripheral wall portion 7a.

Further, a second difference therebetween is that an open/close mechanism 12 capable of opening and closing the drop hole 8 is arranged so that the drop hole 8 is opened by the open/close mechanism 12 only when the waste glass substrates are collected after being dropped into the collection chamber 7.

In addition, a third difference therebetween is that a collection vessel 14 pooling water 13 as nonflammable liquid is arranged directly below the drop hole 8 and the waste glass substrates are directly dropped into the water.

According to the first to third differences described above, only when the waste glass substrates are collected, the open/close mechanism 12 is opened so that the drop hole 8 provided in the floor surface of the cutting chamber 6 is opened. Then, the waste glass substrates drop through the opened drop hole 8 into the collection chamber 7 closed correspondingly to the periphery of the drop hole 8 by the peripheral wall portion 7a except the opened drop hole 8. Further, the waste glass substrates dropped into the collection chamber 7 are collected by being directly dropped into the water 13 pooled in the collection vessel 14 arranged in the collection chamber 7.

Generally, rollers 11 for sandwiching the glass ribbon B are arranged in the annealing chamber 4 and the cooling chamber 5, and shaft portions of the rollers 11 pass through the peripheral wall portions 4a and 5a to the outside thereof so as to be connected to bearings or the like arranged on the outside. Thus, slight clearances are secured between the shaft portions of the rollers 11 and the peripheral wall portions 4a and 5a. In this context, description is made on the case where portions communicated with the outside air are formed in the upper portions of the annealing chamber 4 and the cooling chamber 5 in which atmospheric temperatures are higher than a temperature of the outside air. On the assumption that the collection chamber 7 is communicated with the outside air, owing to a so-called chimney effect, an atmosphere of high temperature flows out from the annealing chamber 4 to the outside and the outside air is sucked through the collection chamber 7, which especially leads to a risk that ascending airflow occurs on the conveyance path. The occurrence of the ascending airflow as described above may constitute a factor of floating the glass chip in the collection chamber 7 into the cutting chamber 6. However, as described above, by defining the space in the collection chamber 7 closed correspondingly to the periphery of the drop hole 8 by the peripheral wall portion 7a except the opened drop hole 8, it is reliably possible to prevent the ascending airflow from occurring owing to the chimney effect. Note that, the collection chamber 7 is closed correspondingly to the periphery of the drop hole 8 by the peripheral wall portion 7a. Thus, dust-collecting efficiency of the dust collector 10 is also enhanced.

Further, except when the waste glass substrates are dropped into the collection chamber 7 from the drop hole 8, a communication state between the cutting chamber 6 and the collection chamber 7 is physically shut by the open/close mechanism 12. Thus, it is significantly advantageous in suppressing a situation where the glass chip in the collection chamber 7 intrudes into the cutting chamber 6.

Further, the waste glass substrates drop directly into the water 13 pooled in the collection vessel 14 arranged in the collection chamber 7. Thus, even when the waste glass substrates suffer breakage, the glass chip produced as a result of the breakage remains in the water. Thus, it is possible to adequately prevent a situation where the glass chip disperses in the collection chamber 7. Further, examples of the method of causing water to act on the waste glass substrates in the collection chamber 7 include atomization of water in the collection chamber 7 instead of pooling the water 13 or simultaneously therewith.

Note that, the present invention is not limited to the above-mentioned embodiments, and various modifications may be made thereto within the spirit of the present invention. For example, in the above-mentioned embodiments, description is made on the case of applying the present invention to production of glass substrates by the overflow downdraw method. Otherwise, the present invention may be similarly applied to glass substrates produced, for example, by a slot downdraw method.

Further, the glass sheet production installation and the glass sheet producing method according to the present invention may be suitably used not only in producing steps for glass substrates for liquid crystal displays but also in producing steps for glass substrates for other flat panel displays such as plasma displays, electroluminescence displays, and field emission displays, and in producing steps for glass sheets used as base materials on which various electronic display function elements and thin films are formed.

The invention claimed is:

1. A glass sheet producing method, in which a sheet-shaped glass ribbon is formed by supplying molten glass into a forming body and causing the molten glass to flow downward on a conveyance path extending in an upper and lower direction from the forming body, and the glass ribbon is cut into a predetermined dimension in a cutting chamber provided on the conveyance path so that glass sheets are produced,
the glass sheet producing method comprising a waste glass sheet collecting step of collecting waste glass sheets of the glass sheets by dropping the waste glass sheets through a drop hole provided in a floor surface of the cutting chamber into a collection chamber provided under the cutting chamber, the glass sheets being obtained by cutting.

2. The glass sheet producing method according to claim 1, wherein the floor surface of the cutting chamber is 2 to 15 m higher than a floor surface of the collection chamber.

3. The glass sheet producing method according to claim 2, wherein the waste glass sheet collecting step is performed in a state in which air pressure in the collection chamber is set to be lower than air pressure in the cutting chamber.

4. The glass sheet producing method according to claim 3, wherein the waste glass sheet collecting step is performed in a state in which the collection chamber is constituted by a space defined by being closed with other chamber-defining surfaces except the opened drop hole.

5. The glass sheet producing method according to claim 2, wherein the waste glass sheet collecting step is performed in a state in which the collection chamber is constituted by a space defined by being closed with other chamber-defining surfaces except the opened drop hole.

6. The glass sheet producing method according to claim 1, wherein the waste glass sheet collecting step is performed in a state in which air pressure in the collection chamber is set to be lower than air pressure in the cutting chamber.

7. The glass sheet producing method according to claim 2, wherein, in the waste glass sheet collecting step, the drop hole is opened only in a case where the waste glass sheets are dropped into the collection chamber.

8. The glass sheet producing method according to claim 6, wherein the waste glass sheet collecting step is performed in a state in which the collection chamber is constituted by a space defined by being closed with other chamber-defining surfaces except the opened drop hole.

9. The glass sheet producing method according to claim 6, wherein, in the waste glass sheet collecting step, the drop hole is opened only in a case where the waste glass sheets are dropped into the collection chamber.

10. The glass sheet producing method according to claim 1, wherein the waste glass sheet collecting step is performed in a state in which the collection chamber is constituted by a space defined by being closed with other chamber-defining surfaces except the opened drop hole.

11. The glass sheet producing method according to claim 1, wherein, in the waste glass sheet collecting step, the drop hole is opened only in a case where the waste glass sheets are dropped into the collection chamber.

12. The glass sheet producing method according to claim 1, wherein the waste glass sheet collecting step is performed while dust in the collection chamber is collected by a dust collector arranged in the collection chamber.

13. The glass sheet producing method according to claim 1, wherein the waste glass sheet collecting step is performed while a clean gas is supplied into at least one of the cutting chamber and spaces thereabove.

14. The glass sheet producing method according to claim 1, wherein, in the waste glass sheet collecting step, nonflammable liquid is caused to act on the waste glass sheets dropped into the collection chamber.

15. The glass sheet producing method according to claim 14, wherein the nonflammable liquid is pooled in the collection chamber, and the waste glass sheets are dropped into the pooled nonflammable liquid.

16. A glass sheet production installation, in which a sheet-shaped glass ribbon is formed by supplying molten glass into a forming body and causing the molten glass to flow downward on a conveyance path extending in an upper and lower direction from the forming body, and the glass ribbon is cut into a predetermined dimension in a cutting chamber provided on the conveyance path so that glass sheets are produced, the glass sheet production installation comprising:

a drop hole provided in a floor surface of the cutting chamber; and a collection chamber provided under the cutting chamber, wherein waste glass sheets of the glass sheets obtained by cutting are collected after being dropped through the drop hole into the collection chamber.

17. The glass sheet production installation according to claim 16, wherein the floor surface of the cutting chamber is provided in a position 2 to 15 m higher than a floor surface of the collection chamber.

18. The glass sheet production installation according to claim 16, wherein air pressure in the collection chamber is set to be lower than air pressure in the cutting chamber.

19. The glass sheet production installation according to claim 16, wherein the collection chamber is constituted by a space defined by being closed with other chamber-defining surfaces except the opened drop hole.

20. The glass sheet production installation according to claim 16, further comprising an open/close mechanism for opening and closing the drop hole.

* * * * *